United States Patent
Zhang et al.

(10) Patent No.: US 12,447,932 B2
(45) Date of Patent: Oct. 21, 2025

(54) METHOD FOR PRESSURE MEASUREMENT DURING TIRE INFLATION, AUTOMATIC INFLATION METHOD, AND TIRE INFLATION PUMP

(71) Applicant: NINGBO CARSTEL MANUFACTURING CO., LTD, Zhejiang (CN)

(72) Inventors: Lei Zhang, Zhejiang (CN); Feng Huang, Zhejiang (CN); Sheng Fang, Zhejiang (CN); Hua Yang, Zhejiang (CN)

(73) Assignee: NINGBO CARSTEL MANUFACTURING CO., LTD., Zhejiang (CN)

( * ) Notice: Subject to any disclaimer, the term of this patent is extended or adjusted under 35 U.S.C. 154(b) by 0 days.

(21) Appl. No.: 18/835,183

(22) PCT Filed: Apr. 14, 2023

(86) PCT No.: PCT/CN2023/088411
§ 371 (c)(1),
(2) Date: Aug. 1, 2024

(87) PCT Pub. No.: WO2023/236655
PCT Pub. Date: Dec. 14, 2023

(65) Prior Publication Data
US 2025/0214546 A1    Jul. 3, 2025

(51) Int. Cl.
*B60S 5/04*    (2006.01)
*G05D 16/20*    (2006.01)

(52) U.S. Cl.
CPC .......... *B60S 5/046* (2013.01); *G05D 16/2066* (2013.01)

(58) Field of Classification Search
CPC ....... B60S 5/046; B60S 5/04; G05D 16/2066; B60C 23/00; B60C 23/02
See application file for complete search history.

(56) References Cited

U.S. PATENT DOCUMENTS 3,982,225 A * 9/1976 Schlanzky ............ B60C 23/007
200/83 C
5,771,834 A * 6/1998 Hsiao .................... B60C 23/007
116/272
(Continued)

FOREIGN PATENT DOCUMENTS

CN    103895457 A    7/2014
CN    110044539 A    7/2019
(Continued)

OTHER PUBLICATIONS

China National Intellectual Property Administration, Application No. PCT/CN2023/088411, mailed Oct. 18, 2023, 5 pages.

*Primary Examiner* — Patrick C Williams
(74) *Attorney, Agent, or Firm* — ZIEGLER IP LAW GROUP, LLC.

(57) ABSTRACT

In order to solve the problem of discrepancies between inflation pressure and actual tire pressure during the tire inflation process, the present invention discloses a correction method and an inflator that implements this method. This significantly reduces the error between the pressure displayed on the gauge and the actual tire pressure, thereby enabling the functionality for automatic inflation and cessation of inflation for the tire.

9 Claims, 1 Drawing Sheet

(56) References Cited

U.S. PATENT DOCUMENTS

| | | | | |
|---|---|---|---|---|
| 7,430,900 | B2 * | 10/2008 | Belanger | B60C 23/04 |
| | | | | 73/146 |
| 7,530,379 | B1 * | 5/2009 | Becker | B60C 23/00318 |
| | | | | 152/416 |
| 8,973,633 | B2 * | 3/2015 | Wilson | B60C 23/00372 |
| | | | | 152/415 |

FOREIGN PATENT DOCUMENTS

| | | |
|---|---|---|
| CN | 110162110 A | 8/2019 |
| CN | 110461628 A | 11/2019 |
| CN | 112406419 A | 2/2021 |
| JP | H0367711 A | 3/1991 |
| JP | H10338105 A | 12/1998 |
| JP | 2007290592 A | 11/2007 |

\* cited by examiner

METHOD FOR PRESSURE MEASUREMENT DURING TIRE INFLATION, AUTOMATIC INFLATION METHOD, AND TIRE INFLATION PUMP

FIELD OF THE INVENTION

The invention relates to a vehicle tire inflating device and process, particularly to a tire inflation pressure detection method, an automatic inflation method, and a tire inflator.

DESCRIPTION OF THE PRIOR ART

Vehicle tire pressure directly affects the vehicle's safety performance, fuel efficiency, and tire lifespan. The normal tire pressure for a car typically ranges between 33.5 to 36.3 psi. Either underinflation or overinflation of the tires may influence the performance of the vehicle's suspension and steering systems, and even increase the risk of tire blowouts.

Different tires have different rated maximum pressures, so when inflating vehicle tires, it's important to ensure the correct pressure is applied. Currently, there are 12V or 24V air pumps available on the market for vehicles, which are powered by the vehicle's battery or their own built-in battery to inflate the tires. When using the pump, the owner connects it to the vehicle's tire with a hose through the tire's valve, inflating the tire. The length of the hose is typically the velocity of the gas in the hose is quite fast, resulting in a significant pressure drop at both ends of the hose. Additionally, the valve core also offers resistance to the flow of gas, causing a pressure difference between the end of the hose and the inside of the tire during inflation.

As shown in FIG. 1, the pressure gauge of the air pump is typically installed at position 1 (on the air pump itself) or position 2 (at the end of the hose near the valve stem). Due to the pressure drop in the hose and the pressure drop caused by the valve core, during high-flow inflation, the readings of the pressure gauges at these two positions are both higher than the pressure inside the tire, making it difficult for the user to accurately gauge the real pressure inside the tire. The pressure gauge at position 1 reads data that is 10-20 psi higher than the actual tire pressure, while the pressure gauge at position 2 reads data that is 8-10 psi higher than the actual tire pressure. Only when the air pump stops inflating and the pressure in the hose balances with the pressure inside the tire, the pressure gauge reading matches the true tire pressure. Since the normal tire pressure for a car is generally between 30-50 psi, it is evident that the maximum deviation of the inflation pressure from the actual tire pressure can even exceed 60%.

Given that whether the air pump's pressure gauge is installed at position 1 or position 2, the measured inflation pressure during the inflation process is different from the actual pressure inside the tire, and the deviation is significant, it follows that existing inflators have difficulty achieving the functionality of automatically stopping inflation once the tire reaches a preset pressure. This is because the readings are affected by the pressure drops in the hose and the valve stem, which can lead to substantial inaccuracies in the measured pressure. As a result, relying on these readings to trigger an automatic shut-off mechanism may not be reliable, and alternative methods or additional sensors might be necessary to accurately control tire inflation to the desired pressure.

SUMMARY OF THE INVENTION

In order to solve the above problems, the present invention provides a tire inflator, comprising a pressure sensing unit and a control unit; wherein the pressure sensing unit is configured to detect the inflation pressure and transmit the measured pressure value to the control unit; the control unit is configured to receive the measured pressure value and pause the inflator motor n times during the inflation process, where n≥3, and substitute the measured pressure values from any three of the n times and the pressure value measured just before or just after each pause into the functional relationship equation between the actual tire pressure P and the inflation pressure $P_0$, $P=aP_0^2+bP_0+c$, to obtain the coefficients a, b, c, thereby determining the functional relationship equation and calculating the actual tire pressure P at any moment during the inflation process based on this equation.

Further, the pause duration is set to 1 second.

Further, the tire inflator comprises a display device for showing the actual tire pressure P.

Further, the control unit is configured to stop the inflator when the actual tire pressure P reaches a preset maximum tire pressure.

Further, the pressure sensing unit is positioned on the body of inflator or on the hose connected thereto.

The present invention further provides a method for detecting pressure during a tire inflation process, comprising the steps of: detecting the inflation pressure to obtain the measured pressure value; pausing the inflator motor n times during the inflation process, where n≥3, and substituting the measured pressure values from any three of the n times and the pressure value measured just before or just after each pause into the functional relationship equation between the actual tire pressure P and the inflation pressure $P_0$, $P=aP_0^2+bP_0+c$, to obtain the coefficients a, b, c; calculating the actual tire pressure P at any moment during the inflation process based on this equation.

Further, the pause duration is set to 1 second.

The present invention further provides a method for automatic inflation, comprising the steps of: detecting the inflation pressure to obtain the measured pressure value; pausing the inflator motor n times during the inflation process, where n≥3, and substituting the measured pressure values from any three of the n times and the pressure value measured just before or just after each pause into the functional relationship equation between the actual tire pressure P and the inflation pressure $P_0$, $P=aP_0^2+bP_0+c$, to obtain the coefficients a, b, c; when the actual tire pressure P reaches the preset maximum tire pressure, stopping the inflator.

Further, the pause duration is set to 1 second.

The present invention, in response to the issue of discrepancies between measured pressure and actual tire pressure during the tire inflation process, provides a correction method and an inflator that applies this method. This can greatly reduce the error between the pressure displayed on the pressure gauge and the actual tire pressure. Consequently, it enables the functionality of automatic inflation and stopping of the tire based on the actual tire pressure.

Referencing now to the figures, conceptions, specific structures and technical effect, the present invention will be further described to provide a thorough understanding of the purpose, features, and effects of the invention.

DETAILED DESCRIPTION OF THE PREFERRED EMBODIMENTS

A plurality of preferred embodiments of the present invention are described below with reference to the drawings, which makes its technical content more clear and convenient to understand. The present invention may be embodied in many different forms of embodiments, and the scope of protection of the present invention is not limited to the embodiments set forth herein.

Figure 1:
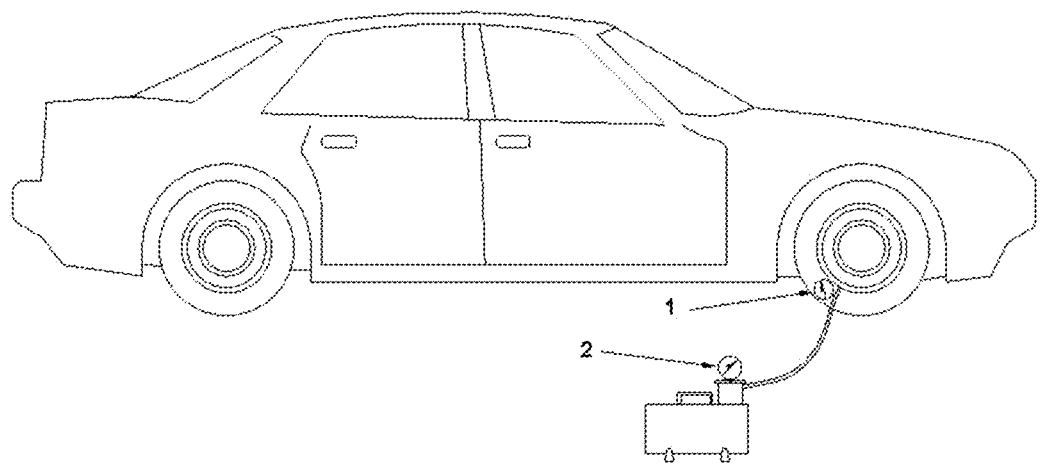
FIG. 1 is a schematic diagram of the pressure gauge placement in a tire inflating process in the prior art.
Figure 2:
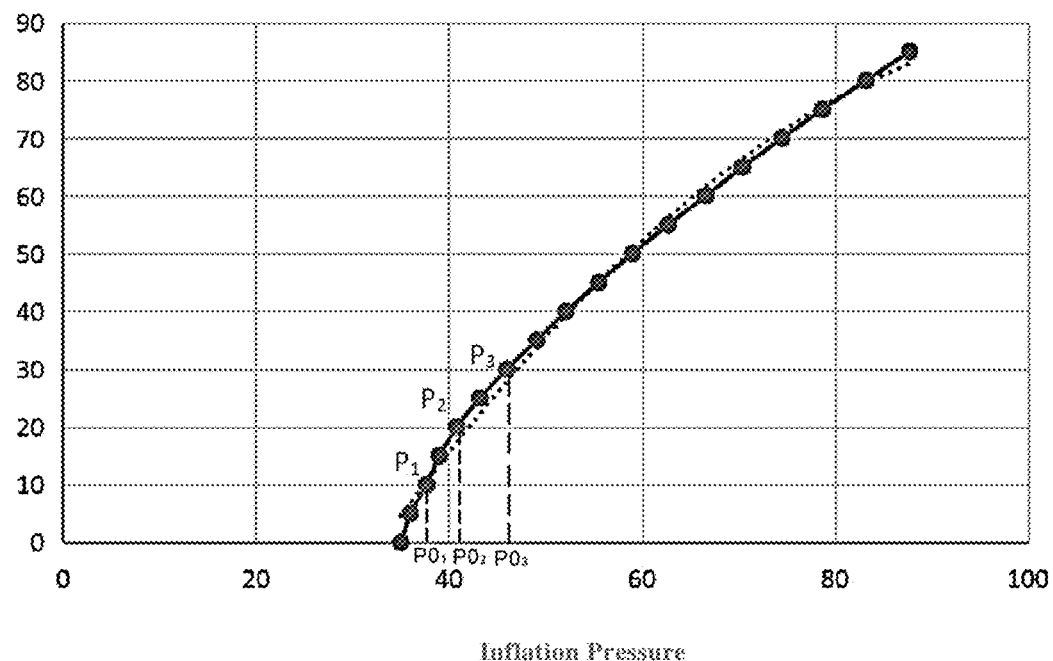
FIG. 2 is a graph illustrating the relationship between inflation pressure and actual tire pressure during the inflation process in a preferred embodiment of the present invention.

As depicted in FIG. 2, tests have revealed that when inflating a tire, the relationship between the actual tire pressure P and the inflation pressure $P_0$ follows a quadratic curve. The mathematical expression of this relationship can be formulated as:

$$P = aP_0^2 + bP_0 + c$$

For a quadratic function curve, at least three points' coordinates are needed to determine its coefficients a, b, and c, thus establishing the function. Since the pressure measured when the air pump stops inflating is consistent with the actual tire pressure, we can measure the actual tire pressure by pausing the inflation momentarily during the process. As shown in FIG. 2, the vertical axis represents the actual tire pressure P, and the horizontal axis represents the inflation pressure $P_0$. In this embodiment, inflation is paused for about 1 second at three points $P_{01}$, $P_{02}$, and $P_{03}$. The pressure measured after stopping the inflation is the actual pressure at each point, $P_1$, $P_2$, and $P_3$, while the measured pressure at the moment just before pausing or just as inflation resumes is the measured pressure at that point, $P_0$. In FIG. 2, the measured pressures and actual pressures at the three points are shown in Table 1.

TABLE 1

| Pausing Point | Inflation Pressure(psi) | Actual Tire Pressure(psi) |
| --- | --- | --- |
| 01 | 37.7 | 10 |
| 02 | 40.8 | 20 |
| 03 | 46 | 30 |

Substituting the values of the aforementioned three points into Equation (1), we can obtain the coefficients a=−0.0151, b=3.3387, and c=93.829 for the actual tire pressure P and the measured pressure $P_0$ in the functional relationship Equation. The functional relationship is then given by:

$$P = -0.0151 \cdot P_0^2 + 3.3387 \cdot P_0 - 93.829$$

The function curve is illustrated by the dashed line in FIG. 2. From this, we can calculate the actual tire pressure at any given moment based on the measured pressure, and use the actual pressure to replace the measured pressure for display or to further control the inflation process based on this.

In practice, the size of different tires and varying lengths of the hose can affect the calculated values of the coefficients a, b, and c in the functional relationship formula. This is because the internal volume of the tire, the resistance of the hose, and the pressure drop across the valve core can all influence the relationship between the measured inflation pressure and the actual tire pressure. Therefore, it may be necessary to calibrate the system for different tire sizes and hose lengths to ensure accurate pressure readings and proper inflation control.

Of course, in other embodiments, the parameters of the function relationship formula can also be further amended through multiple pauses to make them more accurate. In practical use, by adjusting the time interval between each short stop, the error between the measured pressure and the tire's true pressure can be controlled within 2 psi, which means the maximum deviation does not exceed 5% of the actual tire pressure. This approach allows for a more precise inflation process, ensuring that the tire is inflated to the desired pressure level with minimal margin of error.

To implement this method, the inflator according to the present invention should at least have a pressure sensing device and a control unit. The pressure sensing device can be set up externally on the tire, just like in the prior art, such as on the inflator itself. The pressure sensing device transmits the pressure signal to the control unit. The control unit can employ programmable control devices such as a Microcontroller Unit (MCU) or a Programmable Logic Controller (PLC). The control unit receives the pressure signal from the pressure sensing device and controls the start and stops of the air pump motor through a relay, for instance, according to the aforementioned method, and computes the real-time pressure. The inflator according to the present invention generally also includes display devices such as numerical display equipment to show the real-time computed pressure. Additionally, since the present invention can significantly reduce the error between the computed pressure and the actual pressure, the control unit can also set a maximum inflation pressure. This allows the inflator to automatically stop inflating when the tire pressure reaches the maximum pressure, providing a more accurate and safe inflation process.

The foregoing detailed description describes preferred embodiments of the invention. It should be understood that many modifications and variations can be made in accordance with the concepts of the present invention without creative efforts by those of ordinary skill in the art. Accordingly, all the modifications and alterations of the device and method made by those skilled in the art without departing from the spirit shall be deemed as still within the scope of the invention as defined by the appended claims.

The invention claimed is:

1. A tire inflator, comprising a pressure sensing unit and a control unit; wherein the pressure sensing unit is configured to detect the inflation pressure and transmit the measured pressure value to the control unit; the control unit is configured to receive the measured pressure value and pause the inflator motor n times during the inflation process, where n≥3, and substitute the measured pressure values from any three of the n times and the pressure value measured just before or just after each pause into the functional relationship equation between the actual tire pressure P and the inflation pressure $P_0$, $P=aP_0^2+bP_0+c$, to obtain the coefficients a, b, c, thereby determining the functional relationship equation and calculating the actual tire pressure P at any moment during the inflation process based on this equation.

2. The tire inflator as claimed in claim 1, wherein the pause duration is set to 1 second.

3. The tire inflator as claimed in claim 1, wherein further comprises a display device for showing the actual tire pressure P.

4. The tire inflator as claimed in claim 1, wherein the control unit is configured to stop the inflator when the actual tire pressure P reaches a preset maximum tire pressure.

5. The tire inflator as claimed in claim 1, wherein the pressure sensing unit is positioned on the body of inflator or on the hose connected thereto.

6. A method for detecting pressure during a tire inflation process, characterized by comprising the steps of:
  detecting the inflation pressure to obtain the measured pressure value;
  pausing the inflator motor n times during the inflation process, where n≥3, and substituting the measured pressure values from any three of the n times and the pressure value measured just before or just after each pause into the functional relationship equation between the actual tire pressure P and the inflation pressure $P_0$, $P=aP_0^2+bP_0+c$, to obtain the coefficients a, b, c;
  calculating the actual tire pressure P at any moment during the inflation process based on this equation.

7. The method for detecting pressure during a tire inflation process as described in claim 6, wherein the pause duration is set to 1 second.

8. A method for automatic inflation, characterized by comprising the steps of:
  detecting the inflation pressure to obtain the measured pressure value;
  pausing the inflator motor n times during the inflation process, where n≥3, and substituting the measured pressure values from any three of the n times and the pressure value measured just before or just after each pause into the functional relationship equation between the actual tire pressure P and the inflation pressure $P_0$, $P=aP_0^2+bP_0+c$, to obtain the coefficients a, b, c;
  when the actual tire pressure P reaches the preset maximum tire pressure, stopping the inflator.

9. The method for automatic inflation as described in claim 8, wherein the pause duration is set to 1 second.

\* \* \* \* \*